(12) United States Patent
Zhang et al.

(10) Patent No.: US 12,674,542 B2
(45) Date of Patent: Jul. 7, 2026

(54) MOUNTING BRACKET

(71) Applicant: Resideo USA LLC, Golden Valley, MN (US)

(72) Inventors: Jiyang Zhang, Shanghai (CN); Yongjun Chen, Shanghai (CN); Xuemei Wu, Shanghai (CN); Chengrui Yan, Shanghai (CN)

(73) Assignee: Resideo USA LLC, Golden Valley, MN (US)

( * ) Notice: Subject to any disclaimer, the term of this patent is extended or adjusted under 35 U.S.C. 154(b) by 57 days.

(21) Appl. No.: 18/608,126

(22) Filed: Mar. 18, 2024

(65) Prior Publication Data

US 2024/0328573 A1 Oct. 3, 2024

Related U.S. Application Data

(60) Provisional application No. 63/492,266, filed on Mar. 27, 2023.

(51) Int. Cl.
*F16M 13/02* (2006.01)
*F16M 11/14* (2006.01)
(52) U.S. Cl.
CPC ............ *F16M 13/02* (2013.01); *F16M 11/14* (2013.01)
(58) Field of Classification Search
CPC ........ F16M 13/02; F16M 11/14; F16M 13/00; F16M 11/00
See application file for complete search history.

(56) References Cited

U.S. PATENT DOCUMENTS 5,280,871 A * 1/1994 Chuang .................. A45B 17/00
248/516
5,738,344 A * 4/1998 Hagman ................ F16M 11/14
269/20

(Continued)

FOREIGN PATENT DOCUMENTS

DE 9413513 U1 10/1994
EP 4145220 A1 3/2023

OTHER PUBLICATIONS

Extended European Search Report and Written Opinion for European Application No. 24161252.2, mailed Aug. 30, 2024; 7 pages.

(Continued)

*Primary Examiner* — Monica E Millner
(74) *Attorney, Agent, or Firm* — Greenberg Traurig LLP; Nicholas Martin; David J. Dykeman

(57) ABSTRACT

A mounting bracket comprising: a mount for attaching to an object to be supported, said mount comprising a ball-shape end portion having a first diameter; a clamping assembly, comprising: a body defining a bore extending through the body, said bore being configured for accommodating at least the ball-shape end portion of the mount, and a neck at or near one end of the bore, the neck defining a smaller opening than the first diameter to retain the ball-shape end portion within the body; a clamping support located within the bore of the clamping housing, comprising a seat portion adapted to engage the ball-shape end portion of the mount, and a clamping mechanism operable to force the clamping support against the ball shaped end portion so as to clamp the ball-shape end portion between the seat portion and the neck of the body.

17 Claims, 4 Drawing Sheets

(56) References Cited

U.S. PATENT DOCUMENTS

| | | | | |
|---|---|---|---|---|
| 5,790,910 | A * | 8/1998 | Haskin | F16M 13/02 |
| | | | | 396/428 |
| 7,387,284 | B2 * | 6/2008 | Chang | F16C 11/106 |
| | | | | 248/205.5 |
| 2005/0236540 | A1 * | 10/2005 | Bennett | F16M 11/14 |
| | | | | 248/226.11 |
| 2012/0237196 | A1 * | 9/2012 | Li | F16M 11/14 |
| | | | | 396/428 |
| 2014/0138507 | A1 | 5/2014 | Hennessey et al. | |
| 2015/0139635 | A1 * | 5/2015 | Lellky | F16M 11/10 |
| | | | | 396/427 |
| 2017/0337789 | A1 * | 11/2017 | Rosenkvist | F16M 13/02 |
| 2018/0367713 | A1 * | 12/2018 | Gilbert | H04N 23/54 |
| 2021/0109423 | A1 * | 4/2021 | Ramones | F16M 13/02 |
| 2023/0073389 | A1 * | 3/2023 | Homem | F16M 13/022 |
| 2024/0117920 | A1 * | 4/2024 | Choi | F16M 11/2014 |

OTHER PUBLICATIONS

Examination Report in EP Application No. 24 161 252.2 mailed Jul. 28, 2025.

* cited by examiner

100

110

150

120

140

130

100

110

115

120a

120b

150

130

145

140

165

160

MOUNTING BRACKET

RELATED APPLICATIONS

This application claims the benefit of U.S. Provisional Patent Application No. 63/492,266 filed Mar. 27, 2023, the contents of which are incorporated herein by reference.

TECHNICAL FIELD

The present invention generally relates to mounting brackets, in particular anti-tamper mounting brackets configured for mounting outdoor electronic devices.

BACKGROUND

Outdoor electronic devices such as security cameras or other types of sensors are typically mounted on an outdoor mounting surface (e.g., an external wall of a house) by means of mounting brackets. A variety of mounting brackets have been designed and made available on the market which provide an easy and flexible way of mounting outdoor electronic devices. However, in spite of their effectiveness, existing mounting brackets generally are not designed with sufficient consideration in regard to anti-tampering protection. Consequently, existing mounting brackets can be easily tampered and outdoor electronic devices can be removed without leaving much evidence behind.

Objects and aspects of the present claimed invention seek to alleviate at least these problems with the prior art.

SUMMARY

According to an aspect of the present invention, there is provided a mounting bracket. The mounting bracket may comprise a mount for attaching to an object to be supported, said mount comprising a ball-shape end portion having a first diameter. The mounting bracket may further comprise a clamping assembly which may comprise: a body defining a bore extending through the body, said bore being configured for accommodating at least the ball-shape end portion of the mount, and a neck at or near one end of the bore, the neck defining a smaller opening than the first diameter to retain the ball-shape end portion within the body. The clamping assembly may further comprise a clamping support located within the bore of the body, comprising a seat portion adapted to engage the ball-shape end portion of the mount. The clamping assembly may further comprise a clamping mechanism operable to force the clamping support against the ball shaped end portion so as to clamp the ball-shape end portion between the seat portion and the neck of the body.

In an embodiment, the body of the clamping assembly may be a single-piece component. In other embodiments, the body of the clamping assembly may be formed of two or more pieces.

In an embodiment, the clamping mechanism may be adjustable to vary the force applied to the clamping support.

In an embodiment, the clamping support may have a longitudinal axis and a transverse axis and may include a first engagement surface, the clamping mechanism may comprise a second engagement surface and at least one of the first and second engagement surfaces may be inclined relative to the transverse axis, the clamping mechanism and clamping support may be arranged such that the first and second engagement surfaces are in contact and operation of the clamping mechanism creates relative movement between the first and second engagement surfaces that generates a wedging action that moves the clamping support along the longitudinal axis towards the ball-shaped end portion.

In an embodiment, the first and second engagement surfaces may be inclined relative to the transverse axis.

In an embodiment, the first engagement surface may be arranged to translate a force applied to the clamping support by the second engagement surface of the clamping mechanism in the transverse direction to a clamping force applied by the seat portion to the ball-shape end portion in the longitudinal direction.

In an embodiment, the first engagement surface may be located on the clamping support.

In an embodiment, the clamping mechanism may comprise an actuator that is operative to move the second engagement surface in engagement with the first engagement surface.

In an embodiment, the actuator may comprise a manually adjustable screw. In other embodiments, other actuating arrangements may be employed.

In an embodiment, the mounting bracket may further comprise a locking member that engages the clamping support to prevent the body from being removed from the clamping support. In an embodiment, the locking member may be in the form of a set screw. In another embodiment, the locking member may be in the form of a manually adjustable screw.

In an embodiment, the first engagement surface may be part of a groove on a side surface of the clamping support. In an embodiment, the groove may be a dovetail groove. Accordingly, the first engagement surface may be a radially tapered section of the clamping support forming part of the dovetail groove on a side surface of the clamping support. The second engagement surface may be formed by a conically tapered tip of the manually adjustable screw.

In an embodiment, the mounting bracket may further comprise a mounting plate for attaching to a mounting surface, said mounting plate being fixably connectable to an end portion of the clamping support such that the clamping support is prevented from being removed from the mounting plate once connected.

In an embodiment, the mounting plate may comprise an aperture and the clamping support may comprise a protrusion complementary to the aperture such that the protrusion and aperture together to prevent rotation of the clamping support with respect to the mounting plate.

In an embodiment, the protrusion and the aperture may each comprise a complementary polygon shape (e.g., a rectangular shape).

In an embodiment, the clamping support may comprise a threaded bore extending through the end portion of the clamping support, said threaded bore being engageable with a screw arranged to fix the mounting plate to the clamping support.

In an embodiment, the mounting bracket may further comprise a wall cover for covering the mounting plate, said wall cover being threadable onto clamping support or mounting plate.

In an embodiment, the body of the clamping assembly may sit on top of the wall cover so as to prevent the wall cover from being removed from the clamping support or mounting plate.

According to another aspect of the present disclosure, there is provided a mounting bracket comprising a mount (e.g., the mount 310) for supporting an object, said mount may comprise a ball-shape end portion having a first diameter (e.g., the ball-shape end portion 312). The mounting bracket may further comprise a mounting plate (e.g., the mounting plate 340) for attaching to a mounting surface, said mounting plate comprising an aperture (e.g., the aperture 342). The mounting bracket may further comprise a clamping assembly for clamping the ball-shape end portion. The clamping assembly may comprise a clamping support (e.g., the clamping support 326) attachable to the mounting plate, said clamping support comprising a protrusion (e.g., the protrusion 326b) receivable within the aperture. The mounting bracket may further comprise fixing means (e.g., the screw 350) for securing the clamping support to the mounting plate. The protrusion and the aperture may be shaped to rotationally fix the clamping support relative to the mounting plate.

In some embodiments, the mounting bracket may comprise a clamping assembly configured in a similar manner as that of the mounting bracket 300 described above with reference to FIGS. 3A to 5. In some implementations, the mounting bracket may comprise a prior art clamping assembly, such as that comprised in the prior art mounting bracket 100 shown in FIGS. 1 and 2.

In an embodiment, the protrusion and the aperture may each comprise a complementary polygon shape (e.g., a rectangular shape). In an embodiment, the clamping support may comprise a threaded bore (e.g., the threaded bore 326d) extending through an attaching end portion of the clamping support, and the fixing means may comprise a threaded fastener, e.g., a screw, received within said bore to fix the mounting plate to the clamping support.

Other aspects of the invention comprise an assembling process for assembling the mounting bracket according to the first aspect.

BRIEF DESCRIPTION OF THE DRAWINGS

Embodiments of the present invention will now be described by way of example only and with reference to the accompanying drawings, in which like reference characters denote like elements.

DETAILED DESCRIPTION

Figure 1:
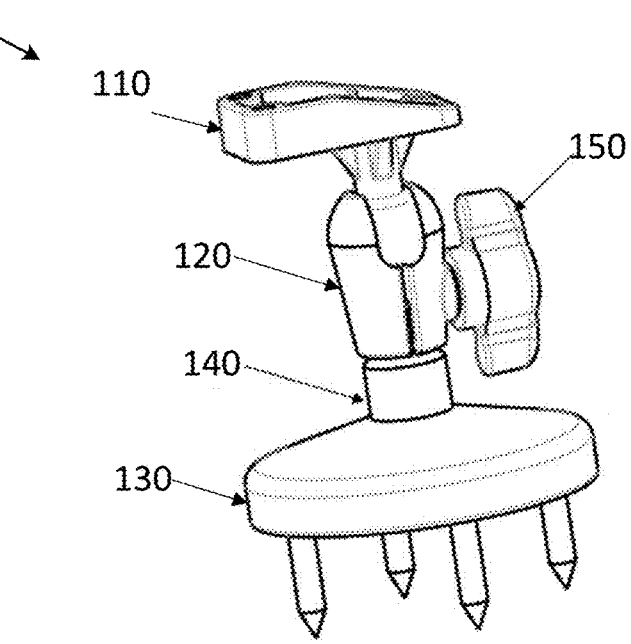
FIG. 1 shows a perspective view of a prior art mounting bracket that is suitable for mounting outdoor electronic devices such as outdoor security cameras.
Figure 2:
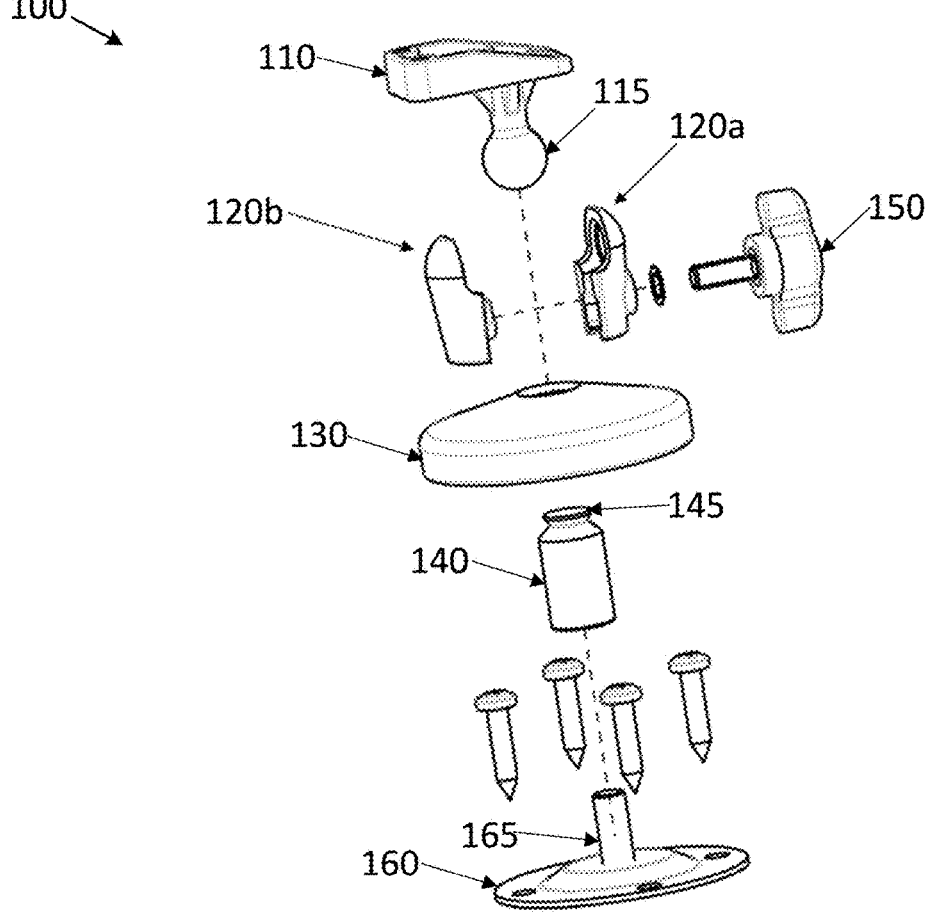
FIG. 2 shows an exploded view of the prior art mounting bracket (e.g., as shown in FIG. 1).

With reference to FIGS. 1 and 2, the prior art mounting bracket 100 comprises a mounting adaptor 110 for attaching to an outdoor electronic device (e.g., an outdoor camera). The mounting adaptor 110 comprises an upper base and a lower ball-shape end portion 115.

The mounting bracket 100 further comprises a clamping housing 120 consisting of a first part 120a and a second part 120b, and a clamping screw 150 terminated with a knob for releasably securing the first part 120a to the second part 120b to form the clamping housing 120. The clamping screw 150 is insertable through a bore of the first part 120a and engageable with internal threads located within a bore of the second part 120b. The knob of the clamping screw 150 enables efficient tightening and loosening of the screw 150.

The mounting bracket 100 further comprises a clamping support 140 having a seat portion 145 at one end for engaging the ball-shape end portion of the mounting adaptor 110. The clamping support 140 comprises a bore extending inwardly from the opposite end to the seat portion 145.

Once secured together, the clamping housing 120 defines an axial bore extending through a center region of the housing 120, said bore being configured for accommodating at least the ball-shape end portion 115 of the mounting adaptor 110 and the seat portion 145 of the clamping support 140. The bore defines a partially enclosed socket at one end of the bore, said partially enclosed socket being configured for retaining the ball-shape end portion 115 of the mounting adaptor 110, and a neck at or near another end of the bore, said neck being configured for retaining the seat portion 145 of the clamping support 140.

The mounting bracket 100 further comprises a mounting plate 160 for attaching to a mounting surface, e.g., by a number of fixing screws (as shown in FIG. 1 or 2). In a central region of the mounting plate 160, there is a tubular protrusion 165 extending from an upper surface of the mounting plate 160, said tubular protrusion 165 being insertable into a bore of the clamping support 140. The mounting plate 160 and the clamping support 140 can be releasably secured together by means of a screw (not shown).

The mounting bracket 100 further comprises a wall cover 130 for covering the mounting plate so as to prevent the fixing screws from being exposed, said wall cover 130 having an annular shape. The central aperture of the annular-shape wall cover 130 is suitably sized to receive the clamping support.

The mounting bracket 100 is typically assembled in the following seven steps:

Step 1: inserting the tubular protrusion 165 of the mounting plate 160 into the bore of the clamping support 140.

Step 2: securing the mounting plate 160 and the clamping support 140 together by inserting a screw from the bottom side of the mounting plate 160 and through its tubular protrusion 165 until the screw engages with internal threads located within the bore of the clamping support 140.

Step 3: fixing the mounting plate 160 (along with the clamping support 140) onto a mounting surface (e.g., an external wall of a premise) using four fixing screws.

Steps 4: covering the mounting plate 160 with the wall cover 130 by receiving the clamping support 140 through the central aperture of the wall cover 130 and moving the wall cover 130 until its circumferential edge is in contact with the mounting surface.

Step 5: bringing the first part 120a of the clamping housing 120 into contact with the ball-shape end portion 115 of the mounting adaptor 110 and the seat portion of the clamping support 140.

Step 6: bringing the second part 120b of the clamping housing 120 into contact with the first part 120a of the clamping housing 120 such that the ball-shape end portion 115 of the mounting adaptor 110 are the seat portion 145 of the clamping support 140 are accommodated by the bore of the clamping housing 120.

Step 7: securing the first part 120a and the second part 120b of the clamping housing 120 by inserting the clamping screw 150 through the bore of the first part 120a until it engages with the internal threads located within the bore of the second part 120b of the clamping housing 120. As such, the ball-shape end portion 115 of the mounting adaptor 110 and the seat portion 145 of the clamping support 140 are both clamped by the clamping housing 120. The clamping force is controlled by turning the knob of the clamping screw 150.

An outdoor electronic device can be attached to the mounting adaptor 110 either before or after the mounting adaptor 110 is clamped by the clamping housing 120. The prior art mounting bracket 100 has several disadvantages.

First, the mounting bracket 100 is difficult to assemble in the field, in particular where the outdoor electronic device needs to be installed at an elevated height. For example, performing steps 5 to 7 requires someone to hold together, with one hand, the mounting adaptor 110, the clamping housing 120, and the clamping support 140 while simultaneously inserting, with another hand, the clamping screw into the first and second parts of the clamping housing 120 to secure all the parts together. Thus, it is likely that one or more parts may fall through the hands during assembly, which means the whole assembling process will need to start again.

Secondly, the prior art mounting bracket 100 does not provide any anti-tamper function. In other words, part or all of the mounting bracket 100 can be removed from the mounting surface in a relatively straight-forward manner. For example, the clamping housing 120 can be easily dissembled by loosening the clamping screw 150. Once dissembled, the mounting adaptor 110 along with the outdoor electronic device attached thereto can be removed. Also, the mounting bracket 100 can be at least partially dissembled by rotating the clamping support 140 with respect to the mounting plate 160, which results in detachment of the clamping support 140 from the mounting plate 160.

Thirdly, the wall cover 130 only loosely covers the mounting plate 160 as it is not securely attached to any part of the mounting bracket 100. Consequently, small vibrations could easily cause the wall cover 130 to move away from its original position, thereby resulting in exposure of the fixing screws.

FIGS. 3A to 5 relate to embodiments of a mounting bracket 300 capable of addressing the above-mentioned problems of the prior art mounting bracket 100. These embodiments are based on an improved bracket design which not only simplifies the assembling process but also enables an anti-tamper mechanism.

According to an aspect of the present disclosure, there is provided a mounting bracket 300. The mounting bracket 300 comprises a mount 310 for attaching to an object to be supported (e.g., an outdoor electronic device). The mount 310 comprises a ball-shape end portion 312 having a first diameter.

Figure 3A:
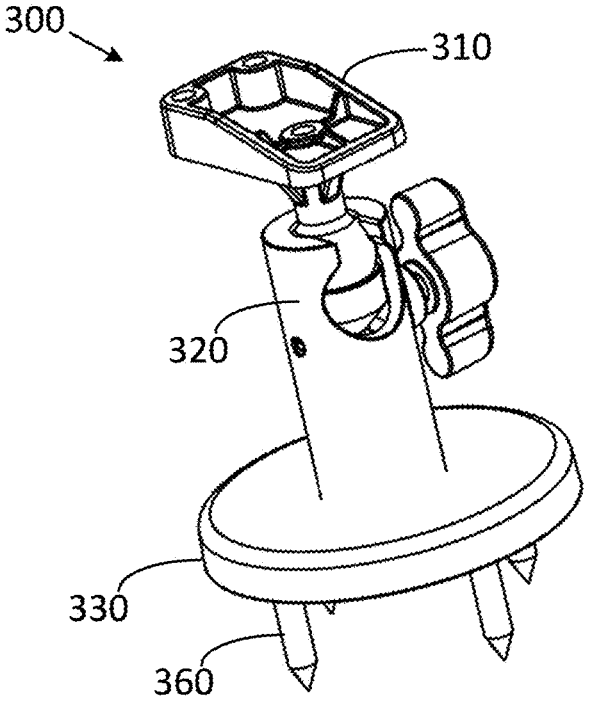
FIG. 3A shows a perspective view of an anti-tamper mounting bracket in accordance with an embodiment.
Figure 3B:
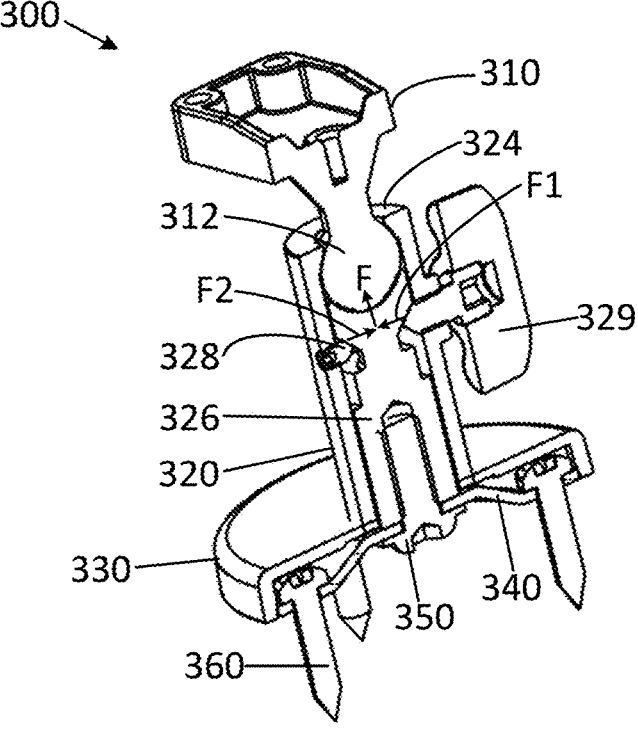
FIG. 3B shows a cross-sectional view of the anti-tamper mounting bracket (e.g., shown in FIG. 3A).

The mounting bracket 300 further comprises a clamping assembly. The clamping assembly comprises a body 320 defining a bore 322 extending through the body 320, said bore 322 being configured for accommodating at least the ball-shape end portion 312 of the mount 310, and a neck 324 at or near one end of the bore 322, the neck 324 defining an opening to the bore having a second diameter smaller than the first diameter to retain and axially restrain the ball-shape end portion 312 within the body 320. The body 320 of the clamping assembly is a single-piece component, although in other embodiments the body 320 may be formed of two or more pieces. This is advantageous over the two-piece clamping housing 120 of the prior art bracket 100 (e.g., as shown in FIGS. 1 and 2) because the single-piece design (e.g., as shown in FIGS. 3A and 3B) enables a simplifier and easier assembling process. The body 320 of the clamping assembly comprises an opening 325 on the side of the body 320, said opening 325 being configured to allow the ball-shape end portion 312 to enter into the bore 322 of the body 320.

The clamping assembly further comprises a clamping support 326 located within the bore 322 of the body 320. The clamping support 326 comprises a seat portion 326a adapted to engage the ball-shape end portion 312 of the mount 310. The clamping support 326 further comprises a protrusion 326b (more details will be described below with reference to FIGS. 4 and 5).

The clamping assembly further comprises a clamping mechanism operable to force the clamping support 326 against the ball shaped end portion 312 so as to clamp the ball-shape end portion 312 between the seat portion 326a and the neck 324 of the body 320. The clamping mechanism is adjustable to vary the force applied to the clamping support 326. The clamping mechanism comprises an actuator, which in the present embodiment consists of a manually adjustable screw 329, although it will be appreciated that other actuating arrangements may be employed.

With reference to FIG. 3B, in the case of the clamping mechanism being embodied as a manually adjustable screw 329 (e.g., as shown in FIG. 3B), the clamping force is adjustable by tightening or loosening the screw 329. The manually adjustable screw 329 is terminated with a knob configured to facilitate turning of the screw 329.

Figure 4:
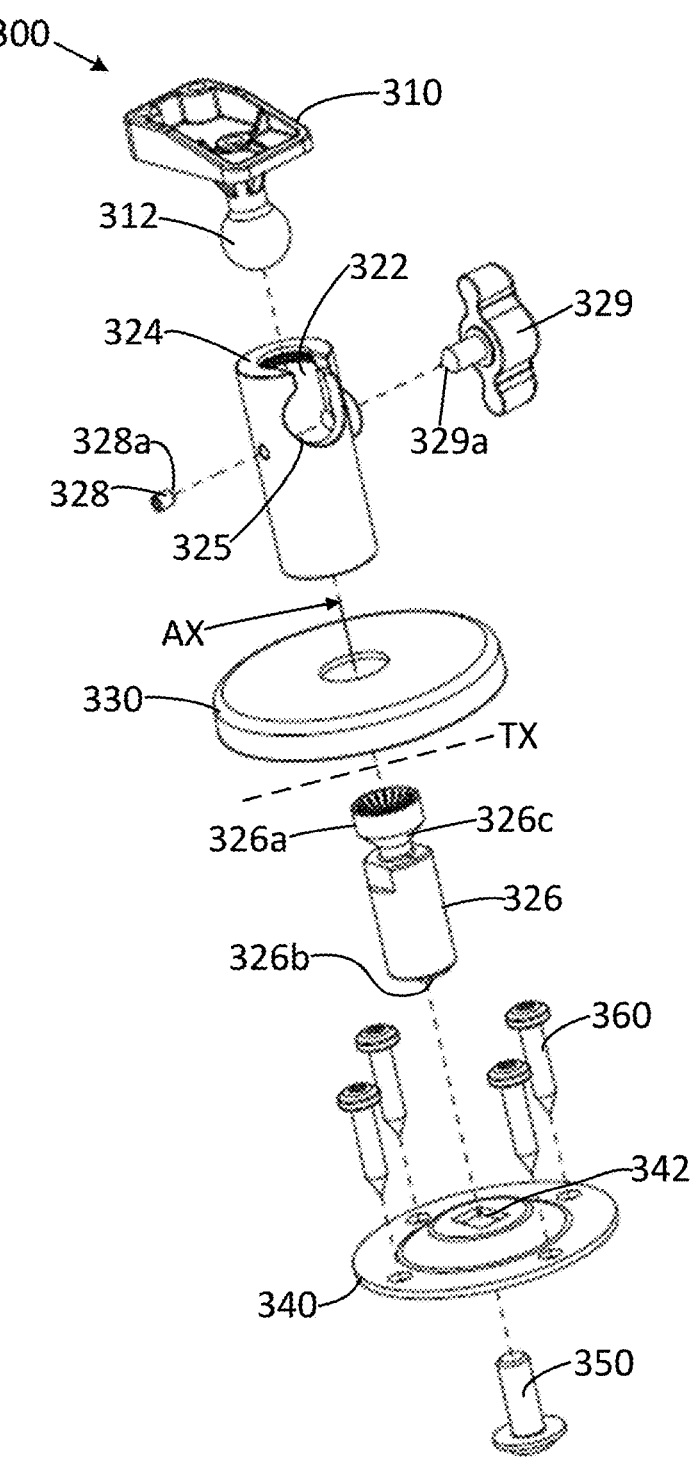
FIG. 4 shows an exploded view of the anti-tamper mounting bracket (e.g., shown in FIG. 3B).

With reference to FIG. 4, the clamping support 326 has a longitudinal axis AX and a transverse axis TX and includes a first engagement surface 326c. The first engagement surface 326c comprises a sloped surface. The first engagement surface 326c is a radially tapered section of the clamping support 326 forming part of a dovetail groove on a side surface of the clamping support 326. The first engagement surface 326c is inclined relative to the transverse axis TX. The clamping mechanism, in this case the manually adjustable screw 329, comprises a second engagement surface 329a that is also inclined relative to the transverse axis TX. The second engagement surface 329a is formed by a conically tapered tip of the screw 329.

Referring back to FIG. 3B, the manually adjustable screw 329 and the clamping support 326 is arranged such that the first engagement surface 326c and second engagement surface 329a are in contact and operation of the manually adjustable screw 329 (e.g., tightening or loosening the lock screw 329) creates relative sliding movement between the first engagement surface 326c and second engagement surface 329a that generates a wedging action that moves the clamping support 326 along the axis AX towards the ball-shaped end portion 312.

With continued reference to FIG. 3B, the first engagement surface 326c and second engagement surface 329a are each inclined relative to the transverse axis TX. The first engagement surface 326c is arranged to translate a force F1 applied to the clamping support 326 by the second engagement surface 329a of the manually adjustable screw 329 in the transverse direction to a clamping force F applied by the seat portion 326a of the clamping support 326 to the ball-shape end portion 312 of the mount 310 in the longitudinal direction.

The mounting bracket 300 further comprises a locking member that engages the clamping support 326 and functions as a stop to prevent the body 320 from being removed from the clamping support 326. The locking member is in the form of a set screw 328 (as shown in FIG. 3B), although in other embodiments the locking member may be in other different forms, for example, in the form of a manually adjustable screw. Even in the case of the manually adjustable screw 329 being removed from the body 320, the set screw 328 still retains the position of the clamping support 326 such that the ball-shape end portion 312 remains clamped between the clamping support 326 and the body 320.

The set screw 328 performs the similar function as the manually adjustable screw 329, i.e. applying a transverse force F2 to the clamping support 326 which then translates the force F2 to a longitudinal clamping force F applied by the seat portion 326a to the ball-shape end portion 312. In such a case, a screw driver may be used to adjust the force applied by the set screw 328. Although using any one of the manually adjustable screw 329 and the set screw 328 will be sufficient to achieve the desired clamping effect, using both screws 328, 329 from two opposite sides of the clamping support 326 may provide a better clamping stability by distributing load across the clamping support 326.

In an alternative embodiment, the mounting bracket 300 may comprise no manually adjustable screw 329. The set screw 328 may function as the sole clamping mechanism operable to apply the desired transverse force (via a third engagement surface 328a) to the clamping support 326 so as to clamp the ball-shape end portion 312 between the seat portion 326a and the neck 324 of the body 320. In addition, the set screw 328 may simultaneously function as a locking member operable to prevent the body 320 from being removed from the clamping support 326. Since the set screw 328 is hidden within the body 320 of the clamping assembly and its operation requires a tool (e.g., a screw driver), it is more difficult to disassemble the mounting bracket 300 in the field than the prior art bracket 100. Consequently, the mounting bracket 300 provides a better anti-tamper function.

With reference to FIG. 4, the mounting bracket 300 further comprises a mounting plate 340 for attaching to a mounting surface, said mounting plate 340 being fixably connectable to an end portion of the clamping support such that the clamping support 326 is prevented from being removed from the mounting plate 340 once connected. The mounting plate 340 comprises an aperture 342 and the clamping support 326 comprises a protrusion 326b complementary to the shape of the aperture 342 such that the protrusion 326b and the aperture 342 cooperate to prevent rotation of the clamping support 326 with respect to the mounting plate 340. The protrusion 326b and the aperture 342 each comprise a complementary polygon shape (e.g., a rectangular shape).

Figure 5:
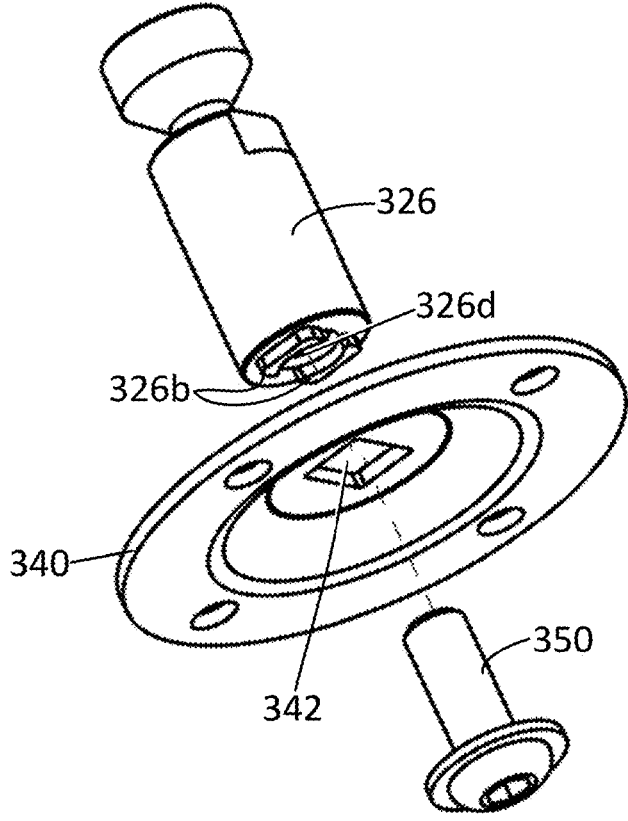
FIG. 5 shows a perspective view of relevant components of the anti-tamper mounting bracket (e.g., shown in FIG. 3B) that are arranged to provide anti-rotation function.

With reference to FIG. 3B and FIG. 5, the clamping support 326 comprises a threaded bore 326d extending through the end portion of the clamping support 326, said threaded bore 326d being engageable with a fixing means 350 comprising a threaded fastener (e.g., a screw) arranged to fix the mounting plate 340 to the clamping support 326. In this way, the clamping support 326 cannot be disconnected from the mounting plate 340 when the mounting plate 340 is secured to the wall and the fixing means 350 is made inaccessible behind the mounting plate 340.

Referring back to FIG. 4, the mounting bracket 300 further comprises a wall cover 330 for covering the mounting plate 340, said wall cover 330 being threadable onto the clamping support 326 or the mounting plate 340. The body of the clamping assembly sits on top of the wall cover 330 so as to prevent the wall cover 330 from being removed from the clamping support 326 or the mounting plate 340. This is advantageous over the wall cover 130 of the prior art mounting bracket 100 which is not securely attached to any part of the mounting bracket 100 and thus only loosely covers the mounting plate 160 (see FIG. 2).

According to another aspect of the present disclosure, there is provided a process for assembling the mounting bracket 300. In an embodiment, the assembling process may comprise the following six steps:

Step 10: inserting the protrusion 326b of the clamping support 326 into the aperture 342 of the mounting plate 340.

Step 20: securing the clamping support 326 and the mounting plate 340 together by inserting the screw 350 from the bottom side of the mounting plate 340 and into the threaded bore 326d of the clamping support 326 so as to engage the screw 350 with the internal threads of the threaded bore 326d.

Step 30: fixing the mounting plate 340 (along with the clamping support 326) onto a mounting surface (e.g., an external wall of a premise) using for example four fixing screws.

Step 40: securing the wall cover 330 to the mounting bracket 300 by threading the wall cover 330 onto the clamping support 326 or the mounting plate 340.

Step 50: inserting the ball-shape end portion 312 of the mount 310 and the seat portion 326a of the clamping support 326 into the bore 322 of the body 320.

Step 60: clamping the ball-shape end portion 312 and the clamping support 326 by tightening one or both of the manually adjustable screw 329 and the set screw 328. In an embodiment, one or both of the manually adjustable screw 329 and the set screw 328 may be inserted into the threaded bores of the body 320 prior to installation of the mounting bracket 300.

In comparison with the assembling process associated with the prior art mounting bracket (e.g., the mounting bracket 100 shown in FIGS. 1 and 2), the above-described process is simpler and easier to implement in the field because it removes the step of holding multiple separate parts together as required in assembling the prior art mounting bracket 100.

The above described embodiment is for illustration only and other embodiments and variations may be envisaged without departing from the scope of the invention.

What is claimed is:

1. A mounting bracket, comprising:
   a mount for attaching to an object to be supported, said mount comprising a ball-shape end portion having a first diameter;
   a clamping assembly, comprising:
      a body defining a bore extending through the body, said bore being configured for accommodating at least the ball-shape end portion of the mount, and
      a neck at or near one end of the bore, the neck defining a smaller opening than the first diameter to retain the ball-shape end portion within the body;
   a clamping support located within the bore of the body, comprising a seat portion adapted to engage the ball-shape end portion of the mount;
   a clamping mechanism operable to force the clamping support against the ball shaped end portion so as to clamp the ball-shape end portion between the seat portion and the neck of the body;
   a mounting plate for attaching to a mounting surface, said mounting plate being fixably connectable to an end portion of the clamping support such that the clamping support is prevented from being removed from the mounting plate once connected, wherein said mounting plate comprises an aperture and the clamping support comprises a protrusion complementary to the aperture such that the protrusion and aperture together to prevent rotation of the clamping support with respect to the mounting plate, and wherein the clamping support comprises a threaded bore extending through the end portion of the clamping support, said threaded bore being engageable with a screw arranged to fix the mounting plate to the clamping support.

2. The mounting bracket of claim 1, wherein the body of the clamping assembly is a single-piece component.

3. The mounting bracket of claim 1, wherein the clamping mechanism is adjustable to vary the force applied to the clamping support.

4. The mounting bracket of claim 3, wherein the clamping support has a longitudinal axis and a transverse axis and includes a first engagement surface, the clamping mechanism comprises a second engagement surface and at least one of the first and second engagement surfaces is inclined relative to the transverse axis, the clamping mechanism and clamping support are arranged such that the first and second engagement surfaces are in contact and operation of the clamping mechanism creates relative movement between the first and second engagement surfaces that generates a wedging action that moves the clamping support along the longitudinal axis towards the ball-shaped end portion.

5. The mounting bracket of claim 4, wherein the first and second engagement surfaces are inclined relative to the transverse axis.

6. The mounting bracket of claim 5, wherein the first engagement surface is arranged to translate a force applied to the clamping support by the second engagement surface of the clamping mechanism in the transverse direction to a clamping force applied by the seat portion to the ball-shape end portion in the longitudinal direction.

7. The mounting bracket of claim 6, wherein the first engagement surface is located on the clamping support.

8. The mounting bracket of claim 7, wherein the clamping mechanism comprises an actuator that is operative to move the second engagement surface in engagement with the first engagement surface.

9. The mounting bracket of claim 8, wherein the actuator comprises a manually adjustable screw.

10. The mounting bracket of claim 4, further comprising a locking member that engages the clamping support to prevent the body from being removed from the clamping support.

11. The mounting bracket of claim 4, wherein the first engagement surface is part of a groove on a side surface of the clamping support.

12. The mounting bracket of claim 1, wherein said protrusion and said aperture each comprises a complementary polygon shape.

13. The mounting bracket of claim 1, further comprising a wall cover for covering the mounting plate, said wall cover being threadable onto clamping support or mounting plate.

14. The mounting bracket of claim 13, wherein the body of the clamping assembly sits on top of the wall cover so as to prevent the wall cover from being removed from the clamping support or mounting plate.

15. A mounting bracket, comprising:

a mount for supporting an object, said mount comprising a ball-shape end portion having a first diameter;

a mounting plate for attaching to a mounting surface, said mounting plate comprising an aperture, said mounting plate being fixably connectable to an end portion of a clamping support such that the clamping support is prevented from being removed from the mounting plate once connected;

a clamping assembly for clamping the ball-shape end portion, comprising said clamping support attachable to the mounting plate, said clamping support comprising a protrusion receivable within the aperture, wherein the protrusion and the aperture together prevent rotation of the clamping support with respect to the mounting plate, and wherein the clamping support comprises a threaded bore extending through the end portion of the clamping support, said threaded bore being engageable with a screw arranged to fix the mounting plate to the clamping support; and fixing means for securing the clamping support to the mounting plate;

wherein the protrusion and the aperture are shaped to rotationally fix the clamping support relative to the mounting plate.

16. The mounting bracket of claim 15, wherein said protrusion and said aperture each comprises a complementary polygon shape.

17. The mounting bracket of claim 16, wherein the fixing means comprises a threaded fastener received within said bore to fix the mounting plate to the clamping support.

* * * * *